US012724748B2

(12) United States Patent
Yu et al.

(10) Patent No.: US 12,724,748 B2
(45) Date of Patent: Sep. 1, 2026

(54) DOCUMENT SHARING METHOD AND APPARATUS, DEVICE, AND MEDIUM

(71) Applicant: Beijing Zitiao Network Technology Co., Ltd., Beijing (CN)

(72) Inventors: Zhou Yu, Beijing (CN); Xuxin Zheng, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 300 days.

(21) Appl. No.: 18/708,523

(22) PCT Filed: Nov. 3, 2022

(86) PCT No.: PCT/CN2022/129453

§ 371 (c)(1),
(2) Date: May 8, 2024

(87) PCT Pub. No.: WO2023/083085

PCT Pub. Date: May 19, 2023

(65) Prior Publication Data

US 2026/0161607 A1 Jun. 11, 2026

(30) Foreign Application Priority Data

Nov. 12, 2021 (CN) ........................ 202111342523.0

(51) Int. Cl.
*G06F 16/17* (2019.01)
*G06F 16/16* (2019.01)
*G06F 16/176* (2019.01)

(52) U.S. Cl.
CPC .......... *G06F 16/176* (2019.01); *G06F 16/168* (2019.01)

(58) Field of Classification Search
CPC ............................ G06F 16/168; G06F 16/176
See application file for complete search history.

(56) References Cited

U.S. PATENT DOCUMENTS 10,474,416 B1 * 11/2019 Farivar ............... H04L 65/4015
2006/0136828 A1 * 6/2006 Asano .................. G06F 3/1454 715/764

(Continued)

FOREIGN PATENT DOCUMENTS

CN 102426479 A 4/2012
CN 104980452 A 10/2015

(Continued)

OTHER PUBLICATIONS

International Patent Application No. PCT/CN2022/129453; Int'l Written Opinion and Search Report; dated Jan. 19, 2023; 5 pages.

(Continued)

*Primary Examiner* — Loc Tran
(74) *Attorney, Agent, or Firm* — BakerHostetler

(57) ABSTRACT

Embodiments of the present disclosure relate to a document sharing method and apparatus, a device, and a medium. The method is applied to a first client and includes: receiving a follow trigger operation for a target document, where the target document is synchronously displayed on the first client and a second client; determining a second trigger position of the follow trigger operation relative to the target document based on a first trigger position of the follow trigger operation relative to a first screen and a first document position of the target document on the first screen; and sending the second trigger position to the second client, such that the second client displays, on a second screen based on a second document position of the target document on the second screen and access address information of the target document, content in the target document that corresponds to the second trigger position.

15 Claims, 5 Drawing Sheets

(56) References Cited

U.S. PATENT DOCUMENTS

| | | | | |
|---|---|---|---|---|
| 2009/0249224 | A1* | 10/2009 | Davis | G06F 40/169<br>715/753 |
| 2018/0234496 | A1* | 8/2018 | Ratias | H04L 67/1095 |
| 2020/0074981 | A1 | 3/2020 | Chae et al. | |

FOREIGN PATENT DOCUMENTS

| | | | |
|---|---|---|---|
| CN | 106843797 | A | 6/2017 |
| CN | 107767879 | A | 3/2018 |
| CN | 108710480 | A | 10/2018 |
| CN | 110737415 | A | 1/2020 |
| CN | 111031386 | A | 4/2020 |
| CN | 111312208 | A | 6/2020 |
| CN | 111427528 | A | 7/2020 |
| CN | 111599342 | A | 8/2020 |
| CN | 111736787 | A | 10/2020 |
| CN | 112256654 | A | 1/2021 |
| CN | 113010136 | A | 6/2021 |
| CN | 113535645 | A | 10/2021 |
| CN | 114064593 | A | 2/2022 |
| WO | WO 2011/000284 | A1 | 1/2011 |

OTHER PUBLICATIONS

International Patent Application No. PCT/CN2022/131094; Int'l Written Opinion and Search Report; dated Dec. 15, 2022; 7 pages.

* cited by examiner

DOCUMENT SHARING METHOD AND APPARATUS, DEVICE, AND MEDIUM

CROSS REFERENCE TO RELATED APPLICATIONS

This application is a U.S. National Stage application under 35 U.S.C. § 371 of International Application No. PCT/CN 2022/129453, as filed on Nov. 3, 2022, which claims priority to Chinese Patent Application No. 202111342523.0, filed on Nov. 12, 2021, and entitled "DOCUMENT SHARING METHOD AND APPARATUS, DEVICE, AND MEDIUM", the disclosures of which are incorporated herein by reference in their entireties.

TECHNICAL FIELD

The present disclosure relates to the field of information sharing technologies, and in particular, to a document sharing method and apparatus, a device, and a medium.

BACKGROUND OF THE INVENTION

With the continuous development of network information technologies, users share information over a network in an increasing number of scenarios.

In some related products, a document can be synchronized between different users, achieving follow-viewing of the document between the users.

SUMMARY OF THE INVENTION

The present disclosure provides a document sharing method and apparatus, a device, and a medium.

An embodiment of the present disclosure provides a document sharing method applied to a first client, the method including: receiving a follow trigger operation for a target document, where the target document is synchronously displayed on the first client and a second client; determining a second trigger position of the follow trigger operation relative to the target document based on a first trigger position of the follow trigger operation relative to a first screen and a first document position of the target document on the first screen; and sending the second trigger position to the second client, such that the second client displays, on a second screen based on a second document position of the target document on the second screen and access address information of the target document, content in the target document that corresponds to the second trigger position.

An embodiment of the present disclosure further provides a document sharing method applied to a second client, the method including: displaying a target document, where the target document is synchronously displayed on a first client; receiving a second trigger position of a follow trigger operation relative to the target document that is sent by the first client, where the second trigger position is determined by the first client based on a first trigger position of the follow trigger operation relative to a first screen and a first document position of the target document on the first screen; and displaying, on a second screen based on a second document position of the target document on the second screen and access address information of the target document, content in the target document that corresponds to the second trigger position.

An embodiment of the present disclosure further provides a document sharing apparatus configured on a first client, the apparatus including: a trigger operation module configured to receive a follow trigger operation for a target document, where the target document is synchronously displayed on the first client and a second client; a relative position module configured to determine a second trigger position of the follow trigger operation relative to the target document based on a first trigger position of the follow trigger operation relative to a first screen and a first document position of the target document on the first screen; and a position sending module configured to send the second trigger position to the second client, such that the second client displays, on a second screen based on a second document position of the target document on the second screen and access address information of the target document, content in the target document that corresponds to the second trigger position.

An embodiment of the present disclosure further provides a document sharing apparatus configured on a second client, the apparatus including: a document display module configured to display a target document, where the target document is synchronously displayed on a first client; a position receiving module configured to receive a second trigger position of a follow trigger operation relative to the target document that is sent by the first client, where the second trigger position is determined by the first client based on a first trigger position of the follow trigger operation relative to a first screen and a first document position of the target document on the first screen; and a follow display module configured to display, on a second screen based on a second document position of the target document on the second screen and access address information of the target document, content in the target document that corresponds to the second trigger position.

An embodiment of the present disclosure further provides an electronic device, including: a processor; and a memory configured to store instructions executable by the processor, where the processor is configured to read the executable instructions from the memory, and execute the instructions to implement the document sharing method provided in the embodiments of the present disclosure.

An embodiment of the present disclosure further provides a computer-readable storage medium having stored thereon a computer program for performing the document sharing method provided in the embodiments of the present disclosure.

An embodiment of the present disclosure further provides a computer program, including instructions that, when executed by a processor, cause the processor to perform the document sharing method provided in the embodiments of the present disclosure.

An embodiment of the present disclosure further provides a computer program product, including instructions that, when executed by a processor, cause the processor to perform the document sharing method provided in the embodiments of the present disclosure.

BRIEF DESCRIPTION OF DRAWINGS

The foregoing and other features, advantages, and aspects of embodiments of the present disclosure become more apparent with reference to the following specific implementations and in conjunction with the accompanying drawings. Throughout the drawings, the same or similar reference numerals denote the same or similar elements. It should be understood that the accompanying drawings are schematic and that parts and elements are not necessarily drawn to scale.

DETAILED DESCRIPTION OF THE INVENTION

Figure 1:
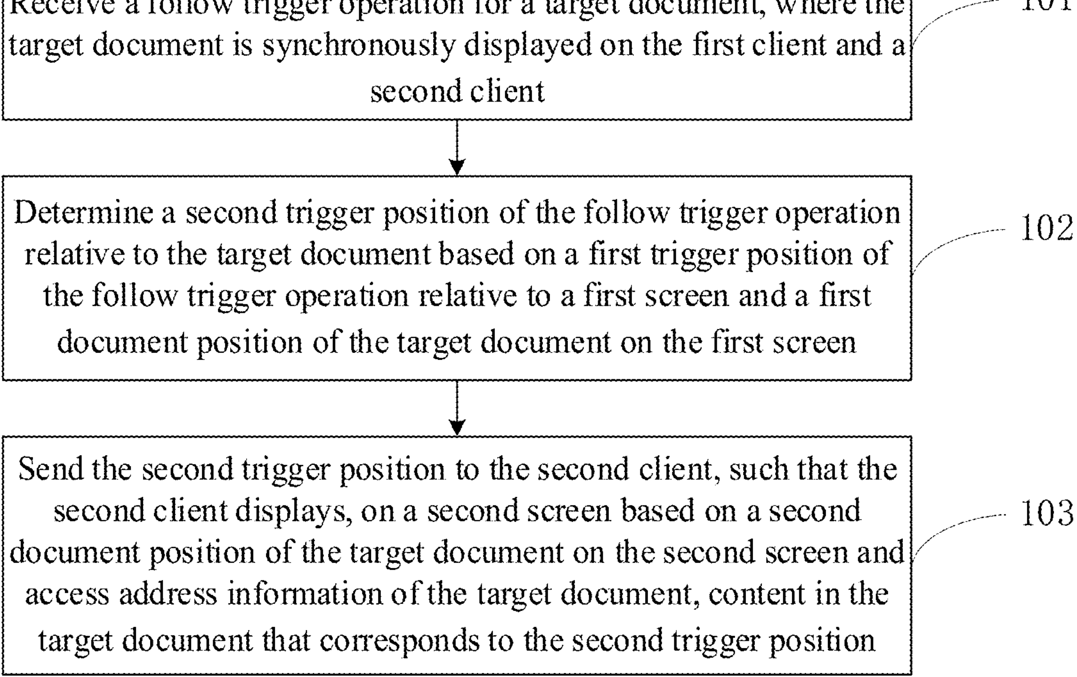
FIG. 1 is a schematic flowchart of a document sharing method according to an embodiment of the present disclosure.

Embodiments of the present disclosure are described in more detail below with reference to the accompanying drawings. Although some embodiments of the present disclosure are shown in the accompanying drawings, it should be understood that the present disclosure may be implemented in various forms and should not be construed as being limited to the embodiments set forth herein. Rather, these embodiments are provided for a more thorough and complete understanding of the present disclosure. It should be understood that the accompanying drawings and the embodiments of the present disclosure are only for exemplary purposes, and are not intended to limit the scope of protection of the present disclosure.

It should be understood that the various steps described in the method implementations of the present disclosure may be performed in different orders, and/or performed in parallel. Furthermore, additional steps may be included and/or the execution of the illustrated steps may be omitted in the method implementations. The scope of the present disclosure is not limited in this respect.

The term "include/comprise" used herein and the variations thereof are an open-ended inclusion, namely, "include/comprise but not limited to". The term "based on" is "at least partially based on". The term "an embodiment" means "at least one embodiment"; the term "another embodiment" means "at least one another embodiment"; and the term "some embodiments" means "at least some embodiments". Related definitions of the other terms will be given in the description below.

It should be noted that concepts such as "first" and "second" mentioned in the present disclosure are only used to distinguish different apparatuses, modules, or units, and are not used to limit the sequence of functions performed by these apparatuses, modules, or units or interdependence.

It should be noted that the modifiers "one" and "a plurality of" mentioned in the present disclosure are illustrative and not restrictive, and those skilled in the art should understand that unless the context clearly indicates otherwise, the modifiers should be understood as "one or more".

The names of messages or information exchanged between a plurality of apparatuses in the implementations of the present disclosure are used for illustrative purposes only, and are not used to limit the scope of these messages or information.

In some related products, a document can be synchronized between different users. Specifically, a sharer can synchronize the document and operations with a sharee, so that the sharee can follow the sharer to view the document. However, since clients of different users vary in hardware parameters such as a screen size and resolution, there may be inconsistency in content that the users see. Such inconsistency specifically includes the following two aspects: Content on a screen of the sharer may be more than that on a screen of the sharee. As a result, when the sharer is explaining the content at the bottom of the screen, the sharee is unable to see the corresponding content. Alternatively, for comments in the document, a position of the comments is synchronized to the sharee only after the sharer clicks on the comments, and if the sharer does not click on the comments and there are too many comments on the same screen, it may result in inconsistency in content of the comments that the users see.

In order to solve the above problems, the embodiments of the present disclosure provide a document sharing method and apparatus, a device, and a medium. Compared with the related art, the technical solutions provided in the embodiments of the present disclosure have the following advantages: In a document sharing solution provided in the embodiments of the present disclosure, a first client may receive a follow trigger operation for a target document, where the target document is synchronously displayed on the first client and a second client; determine a second trigger position of the follow trigger operation relative to the target document based on a first trigger position of the follow trigger operation relative to a first screen and a first document position of the target document on the first screen; and send the second trigger position to the second client, such that the second client displays, on a second screen based on a second document position of the target document on the second screen and access address information of the target document, content in the target document that corresponds to the second trigger position. With the above solution, after a document is synchronously displayed on the two clients, the first client can determine a relative position of the follow trigger operation in the document based on a position of the follow trigger operation of a user relative to a screen and a position of the document on the screen, the first client can send the relative position to the second client, and the second client can display, on its screen, content corresponding to the relative position, so that the content seen by a user of the second client must be an area where the follow trigger operation of the user of the first client is located, ensuring that the users of the two clients sharing the document can see the same content synchronously, and avoiding the situation of inconsistency in the content seen by different users in the related art, thereby improving experience of document sharing.

FIG. 1 is a schematic flowchart of a document sharing method according to an embodiment of the present disclosure. The method may be performed by a document sharing apparatus, which may be implemented using software and/or hardware and may generally be integrated into an electronic device. As shown in FIG. 1, the method is applied to a first client, and includes the following steps.

Step 101: Receive a follow trigger operation for a target document, where the target document is synchronously displayed on the first client and a second client.

The first client and the second client are collaborators for the target document.

Optionally, the first client and the second client may initiate collaboration on the target document based on a real-time multimedia conference. The target document may be a document shared and viewed on the first client and the second client during collaboration. In this embodiment of the present disclosure, the first client may be an initiator of the sharing, and the second client may be a follower of the sharing.

In this embodiment of the present disclosure, the first client may send the target document to the second client, such that both the first client and the second client can display the target document; and then the first client may detect a follow trigger operation of a user for the target document during display of the target document. Alternatively, the first client may send access address information of the target document to the second client, such that the second client can access the target document based on the access address information.

Further, if during collaboration, there is a need to synchronously display the target document on the collaborators, the first client and/or the second client may trigger a request for synchronous display, so that the follower of the sharing (for example, the second client) can not only access the target document shared by the initiator of the sharing (for example, the first client), but also browse the target document synchronously as the initiator browses the target document.

The follow trigger operation may be a trigger operation, performed by the user of the first client when there is a change in focus while viewing the target document, that the second client needs to adaptively follow. The follow trigger operation in this embodiment of the present disclosure may include, but is not limited to, a hover operation or a click operation, etc.

Step 102: Determine a second trigger position of the follow trigger operation relative to the target document based on a first trigger position of the follow trigger operation relative to a first screen and a first document position of the target document on the first screen.

The first screen may be a screen of the first client. The first trigger position may be a position of the follow trigger operation on the first screen, which may be determined by a listener program in the first client. For example, a position of a follow trigger operation of a mouse on the first screen can be determined by the listener program listening a mouse movement event. The first document position of the target document on the first screen may be obtained from an underlying rendering engine of the first client that renders the target document. The second trigger position may be a position of the follow trigger operation relative to the target document.

The target document may include a plurality of document modules, each of the document modules corresponds to one content type, and the content type includes at least one of table of contents, body text, body image, and comments. The document module may be a unit module that constitutes the document. Different document modules correspond to different content types. A number of document modules is not limited. The content type corresponding to a document module may include at least one of table of contents, body text, body image, comments, etc. When the target document includes a plurality of document modules, the first document position includes a position of a first displayed document module in the plurality of document modules on the first screen, and the first displayed document module is a document module that is being displayed on the first screen.

In this embodiment of the present disclosure, determining the second trigger position of the follow trigger operation relative to the target document based on the first trigger position of the follow trigger operation relative to the first screen and the first document position of the target document on the first screen may include: determining, based on the first trigger position and a position of the first displayed document module in the target document on the first screen, a target document module corresponding to a trigger position of the follow trigger operation; and determining the second trigger position of the follow trigger operation relative to the target document module based on the first trigger position and a position of the target document module on the first screen.

Specifically, the first client may first determine a document module where the trigger operation of the follow trigger operation is located (that is, the target document module) based on the first trigger position of the follow trigger operation relative to the first screen and the position of the first displayed document module on the first screen, and then calculate a relative position of the follow trigger operation in the target document module (that is, the second trigger position) based on the first trigger position of the follow trigger operation relative to the first screen and the position of the target document module on the first screen.

Optionally, when the content type corresponding to the target document module is a table of contents or body text, determining the second trigger position of the follow trigger operation relative to the target document module includes: determining a word percentage of a number of words between the trigger position of the follow trigger operation and a start position of the target document module in a total number of words in the target document module, and determining the second trigger position based on the word percentage.

When the content type of the target document module is a table of contents or body text, since both the table of contents and the body text are composed of a plurality of words, when determining the second trigger position, the first client can determine the number of words between the trigger position of the follow trigger operation and the start position of the target document module, then calculate the word percentage of the number of words in the total number of words in the target document module, and determine the word percentage as the second trigger position.

A percentage position of the trigger position of the follow trigger operation in the table of contents or the body text is determined, so that the relative position of the follow trigger operation in the table of contents or the body text can be accurately represented, and the relative position does not change due to a position and a size of the table of contents or the body text varying on screens of different clients, thereby improving the accuracy.

Optionally, when the content type corresponding to the target document module is comments, determining the second trigger position of the follow trigger operation relative to the target document module includes determining identification information of a comment area in the target document module as the second trigger position if the trigger position of the follow trigger operation is in the comment area.

When the content type of the target document module is comments, since the comments may include a plurality of comment areas, and the comment area may be an area where a comment is displayed, different comment areas correspond to different identification information. The identification information is used to distinguish the comment areas, specifically, it may be represented by numbers, letters, etc. When determining the second trigger position, the first client may locate the trigger position of the follow trigger operation in the comment area in the comments, and then determine, as the second trigger position, the identification information of the comment area where the trigger position is located.

The identification information of the comment area is used as a relative position of the follow trigger operation in the comments. Since area information does not change due to a position and a size of the comments varying on the screens of different clients, the accuracy is improved.

Optionally, when the content type corresponding to the target document module is a body image, determining the second trigger position of the follow trigger operation relative to the target document module may include: determining coordinates of the trigger position of the follow trigger operation in the body image, and determining the second trigger position based on a ratio of the coordinates of the trigger position of the follow trigger operation in the body image to a first size of the body image on the first screen.

The first size may be specific values of the length and width of the body image on the first screen.

The first client can determine the coordinates of the trigger position of the follow trigger operation in the body image based on the first trigger position of the follow trigger operation relative to the first screen and a position of the body image on the first screen, where the coordinates include values of an x-axis and a y-axis; and then calculate the first size based on the position of the body image on the first screen, and determine the ratio of the coordinates of the trigger position of the follow trigger operation in the body image to the first size as the second trigger position.

For example, assuming that the first size is 100 px×100 px and the coordinates of the trigger position of the follow trigger operation in the body image are 5 px×5 px, the ratio may be (5/100)×(5/100).

The ratio of the coordinates of the follow trigger operation in the body image to the size of the body image is used as a relative position of the follow trigger operation in the body image. Since the ratio does not change due to the position and the size of the comments varying on the screens of different clients, the accuracy of determining the relative position of the follow trigger operation in the body image is improved.

Step 103: Send the second trigger position to the second client, such that the second client displays, on a second screen based on a second document position of the target document on the second screen and access address information of the target document, content in the target document that corresponds to the second trigger position.

The second screen may be a screen of the second client. The second document position of the target document on the second screen may be obtained from an underlying rendering engine of the second client that renders the target document. The access address information of the target document may be used to access a storage address in a server, so as to obtain the target document.

Specifically, after determining the second trigger position of the follow trigger operation relative to the target document, the first client may send the second trigger position to the second client. The second client may first obtain the target document based on the access address information of the target document, and then display, on the second screen based on the second document position of the target document on the second screen, the content in the target document that corresponds to the second trigger position, that is, display the content at the second trigger position in a preset area on the second screen, such that a user of the second client can follow a user of the first client to view the same content in the target document. Optionally, the preset area may be an area on the second screen that can be intuitively seen by the user, which is set according to actual situations. For example, the preset area may be an area on the second screen where the sight of the user is focused on, or a center area, etc.

The content in the target document that corresponds to the second trigger position is displayed in the preset area on the second screen, where the preset area is the area on the second screen where the sight of the user is focused on.

Figure 2:
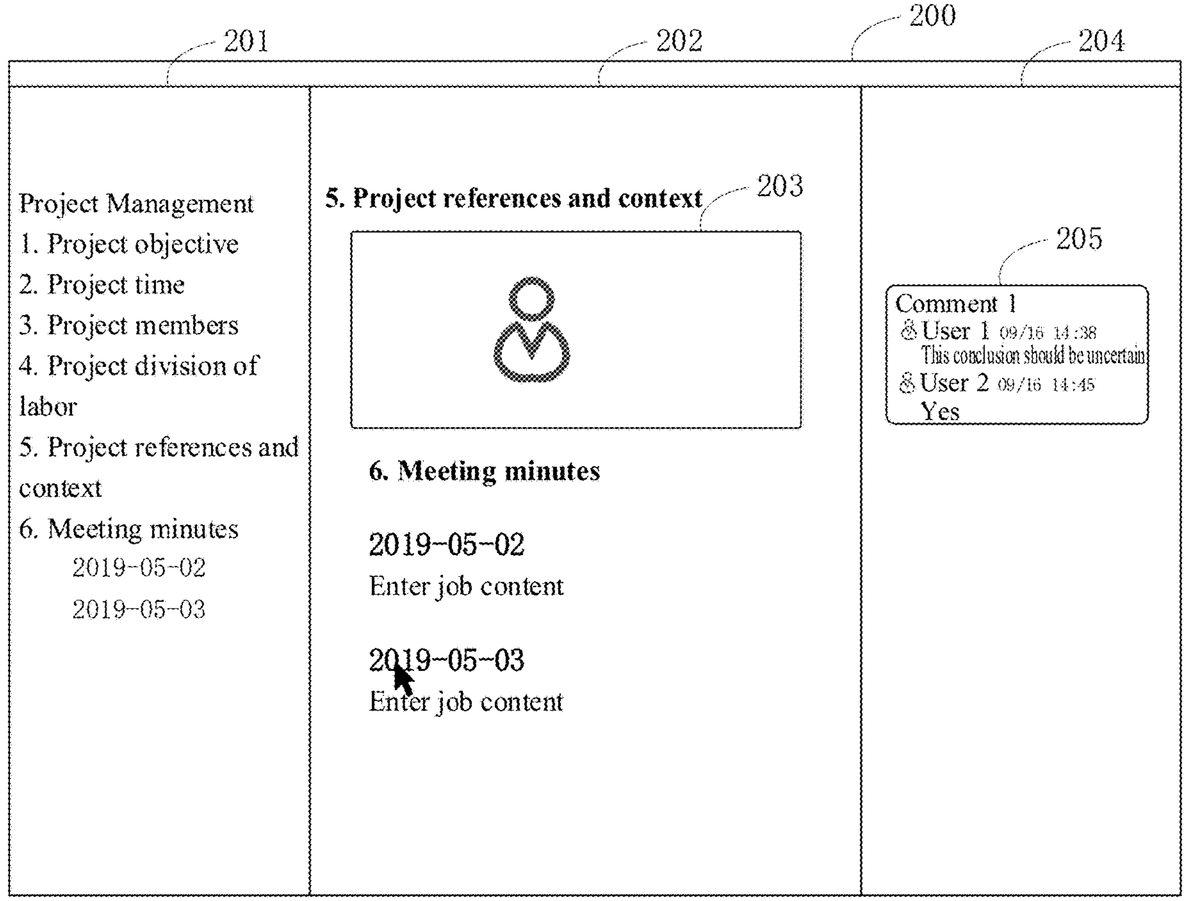
FIG. 2 is a schematic diagram of a document display according to an embodiment of the present disclosure.

For example, FIG. 2 is a schematic diagram of a document display according to an embodiment of the present disclosure. FIG. 2 shows a target document displayed on a first screen 200 of a first client. The target document may include four document modules in the figure, and corresponding content types of the modules are a table of contents 201, body text 202, a body image 203, and comments 204, respectively. In FIG. 2, an arrow is used to indicate a trigger position of a follow trigger operation on the first client. For example, the trigger position may be a position of a hover operation from a mouse. After determining a second trigger position of the follow trigger operation relative to the target document, the first client may send the second trigger position to a second client.

Figure 3:
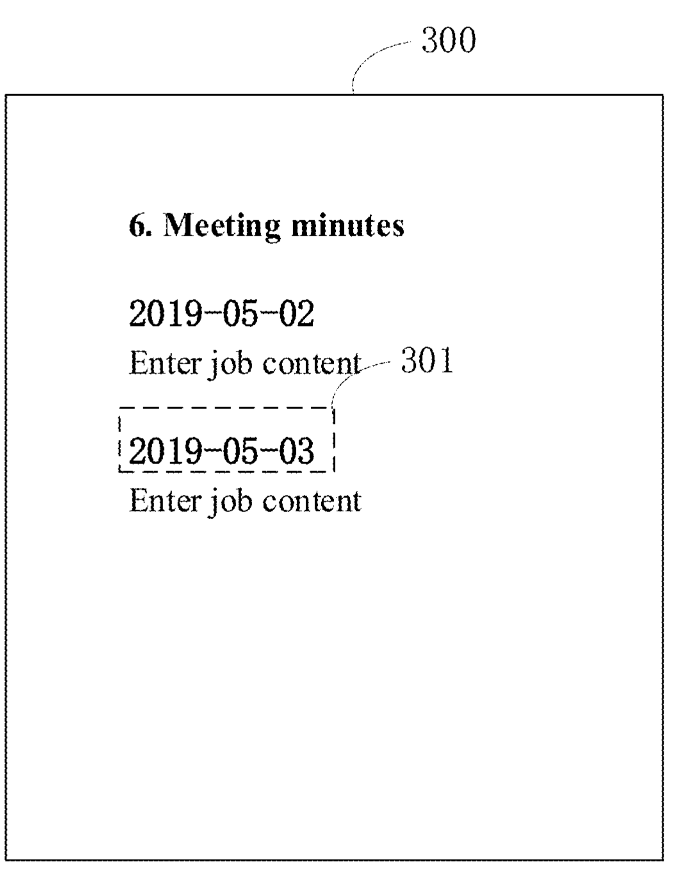
FIG. 3 is a schematic diagram of another document display according to an embodiment of the present disclosure.

For example, FIG. 3 is a schematic diagram of another document display according to an embodiment of the present disclosure. FIG. 3 shows a target document displayed on a second screen 300 of a second client. In contrast to FIG. 2, only body text is displayed in the target document in FIG. 3, and a position and a size of the body text are different from those of the body text in FIG. 2. In FIG. 3, a text line in a dashed box 301 is displayed at the center of the second screen 300. The text line is content in the target document that is determined by the second client and that corresponds to the second trigger position of the follow trigger operation relative to the target document.

Referring to FIG. 2 and FIG. 3, the content seen by a user of the second client on the second screen 300 is content corresponding to the follow trigger operation of a user of the first client on the first screen 200, ensuring that the users of the two clients sharing the document can see the same content synchronously.

In the document sharing solution provided in this embodiment of the present disclosure, the first client may receive the follow trigger operation for the target document, where the target document is synchronously displayed on the first client and the second client; determine the second trigger position of the follow trigger operation relative to the target document based on the first trigger position of the follow trigger operation relative to the first screen and the first document position of the target document on the first screen; and send the second trigger position to the second client, such that the second client displays, on the second screen based on the second document position of the target document on the second screen and the access address information of the target document, the content in the target document that corresponds to the second trigger position. With the above solution, after a document is synchronously displayed on the two clients, the first client can determine a relative position of the follow trigger operation in the document based on a position of the follow trigger operation of a user relative to a screen and a position of the document on the screen, the first client can send the relative position to the second client, and the second client can display, on its screen, content corresponding to the relative position, so that the content seen by a user of the second client must be an area where the follow trigger operation of the user of the first client is located, ensuring that the users of the two clients sharing the document can see the same content synchronously, and avoiding the situation of inconsistency in the content seen by different users in the related art, thereby improving experience of document sharing.

Figure 4:
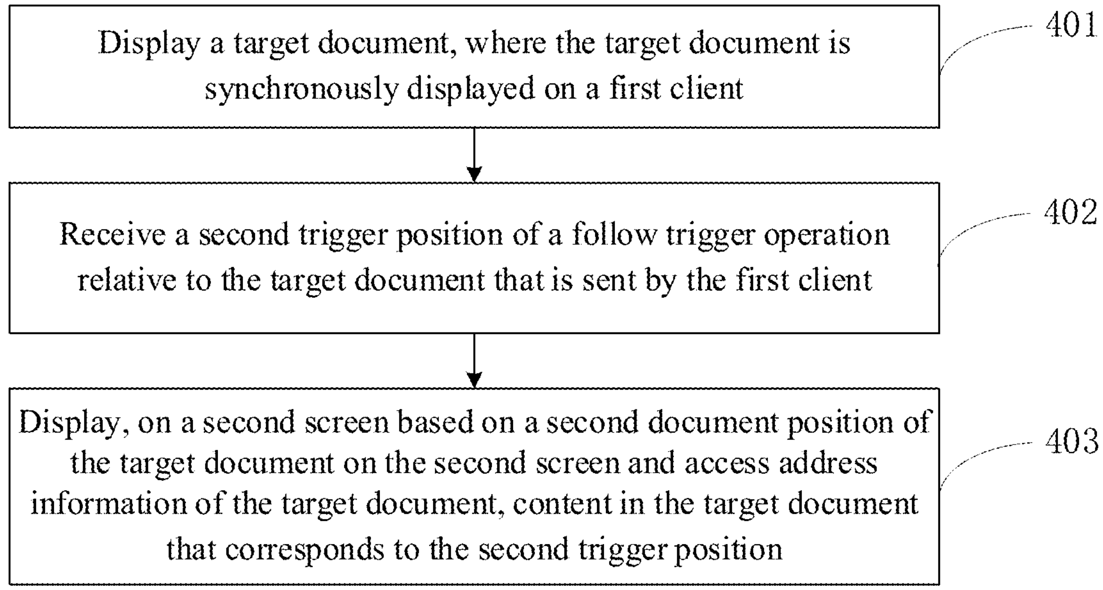
FIG. 4 is a schematic flowchart of another document sharing method according to an embodiment of the present disclosure.

FIG. 4 is a schematic flowchart of another document sharing method according to an embodiment of the present disclosure. The method may be performed by a document sharing apparatus, which may be implemented using software and/or hardware and may generally be integrated into an electronic device. As shown in FIG. 4, the method is applied to a second client, and includes the following steps.

Step 401: Display a target document, where the target document is synchronously displayed on a first client.

The target document may be a document shared and viewed on the first client and the second client. In this embodiment of the present disclosure, the first client may be an initiator of sharing, and the second client may be a follower of sharing.

In this embodiment of the present disclosure, the second client may receive the target document sent by the first client or access address information of the target document, and display the target document synchronously with the first client.

Step 402: Receive a second trigger position of a follow trigger operation relative to the target document that is sent by the first client.

The follow trigger operation may be a trigger operation, performed by the user of the first client as there is a change in focus while viewing the target document, that the second client needs to adaptively follow. The follow trigger operation in this embodiment of the present disclosure may include a hover operation or a click operation, etc.

The target document may include a plurality of document modules, each of the document modules corresponds to one content type, and the content type includes at least one of table of contents, body text, body image, and comments. The document module may be a unit module that constitutes the document. Different document modules correspond to different content types. A number of document modules is not limited. The content type corresponding to a document module may include at least one of table of contents, body text, body image, comments, etc. When the target document includes a plurality of document modules, a second document position includes a position of a second displayed document module in the plurality of modules on a second screen, and the second displayed document module is a document module that has been displayed on the second screen.

The second trigger position is determined by the first client based on a first trigger position of the follow trigger operation relative to a first screen and a first document position of the target document on the first screen.

In this embodiment of the present disclosure, the first client may determine the second trigger position of the follow trigger operation relative to the target document based on the first trigger position of the follow trigger operation relative to the first screen and the first document position of the target document on the first screen, with the specific determination process as described above, which will not be repeated here.

Afterwards, the second trigger position may be sent to the second client, which may receive the second trigger position.

Step 403: Display, on a second screen based on a second document position of the target document on the second screen and access address information of the target document, content in the target document that corresponds to the second trigger position.

Since the target document may include a plurality of document modules, and the trigger position of the follow trigger operation corresponds to a target document module in the plurality of document modules, the second trigger position is a position of the follow trigger operation relative to the target document module, where the target document module is a document module in the target document that corresponds to the follow trigger operation.

Optionally, if the content type corresponding to the target document module is a table of contents or body text, the second trigger position is determined based on a word percentage of a number of words between the trigger position of the follow trigger operation and a start position of the target document module in a total number of words in the target document module. Displaying, on the second screen based on the second document position of the target document on the second screen, the content in the target document that corresponds to the second trigger position includes: determining target words corresponding to the word percentage in the table of contents or the body text based on a position of the table of contents or the body text on the second screen, and displaying, on the second screen, the target words or a text line where the target words are located.

When the content type corresponding to the target document module is a table of contents or body text, the second trigger position may be the word percentage corresponding to the trigger position of the follow trigger operation. The second client may determine, based on the position of the target or the body text on the second screen and the word percentage, the target words corresponding to the follow trigger operation. Afterwards, the target words or the text line where the target words are located may be determined as the content in the target document that corresponds to the second trigger position, and adjusted to be displayed on the second screen, such that a user of the second client can see the words or text line where the follow trigger operation of the user of the first client is located.

Optionally, when the content type corresponding to the target document module is comments, the second trigger position is identification information of a comment area in the target document module where the trigger position of the follow trigger operation is located. Displaying, on the second screen based on the second document position of the target document on the second screen, the content in the target document that corresponds to the second trigger position includes: locating the comment area in the comments according to the identification information and based on a position of the comments on the second screen, and displaying the comment area on the second screen.

When the content type of the target document module is comments, since the comments may include a plurality of comment areas, and the comment area may be an area where a comment is displayed, different comment areas correspond to different identification information. The second trigger position may be the identification information in the comments where the trigger position of the follow trigger operation is located. The second client may locate the comment area corresponding to the identification information in the comments based on the position of the comments on the second screen, and adjust the comment area to be displayed on the second screen, such that the user of the second client can see the comment area where the follow trigger operation of the user of the first client is located, which solves the problem of different users seeing different comment areas due to a large number of comments or a need for a fixed trigger to be able to follow in the related art, and improves the accuracy of follow-viewing.

In this embodiment of the present disclosure, after displaying the comment area on the second screen, the document sharing method may further include: prominently displaying the comment area in a preset manner, where the preset manner includes at least one of highlighting, bolding, and underlining.

The preset manner may be any feasible display manner that can be distinguished from other comment areas in the comments, for example, it may include, but is not limited to, at least one of highlighting, bolding, and underlining.

After displaying, on the second screen, the comment area in the comments that corresponds to the follow trigger operation, the second client may prominently display the comment area in the preset manner, to distinguish it from other comment areas in the comments. In addition, the comment area can also be prominently displayed in the same manner on the first screen of the first client. Optionally, after the comment area is prominently displayed in the preset manner, the comment area is activated and can receive new comments entered by the user.

Figure 5:
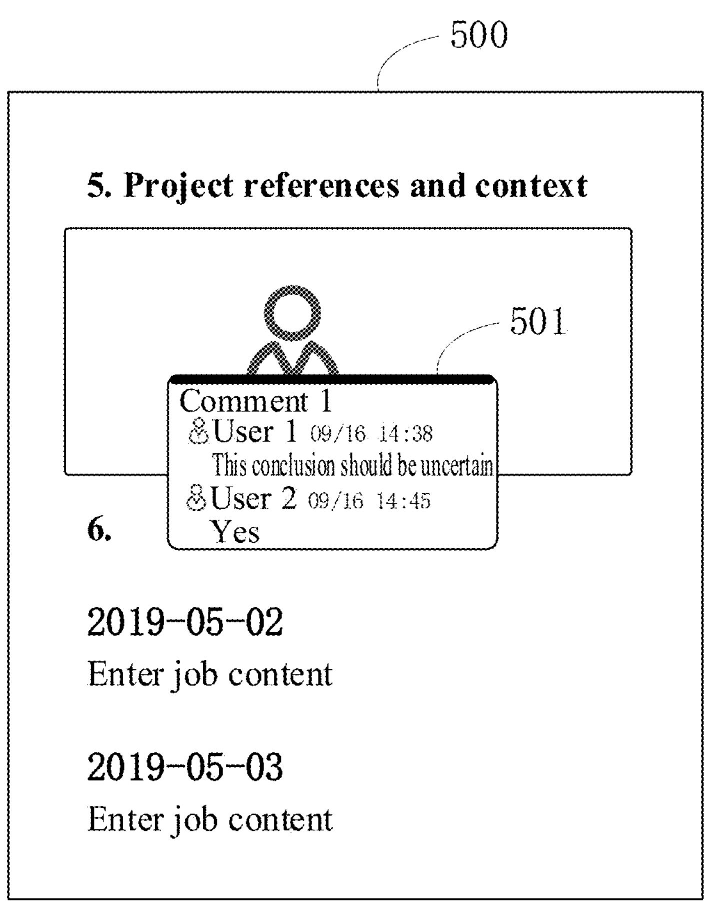
FIG. 5 is a schematic diagram of still another document display according to an embodiment of the present disclosure.

For example, FIG. 5 is a schematic diagram of still another document display according to an embodiment of the present disclosure. FIG. 5 shows a target document displayed on a second screen 500 of a second client. In contrast to FIG. 2, this figure shows only body text. When the trigger position of the follow trigger operation is in a comment area 205 in FIG. 2, a comment area 501 in FIG. 5 has the same identification information as the comment area 205 in FIG. 2, that is, the comment area 501 and the comment area 205 are the same comment area in the target document. Since the comment area 501 is not displayed on the second screen 500, the comment area 501 can be displayed at the center of the second screen 500, and can be prominently displayed with an upper boundary of the area being bolded, which is only an example.

In the above solution, when the follow trigger operation is in a comment area in the comments, the first client and the second client that the document is shared with can prominently display the comment area and synchronously browse the comment area.

Optionally, when the content type corresponding to the target document is a body image, the second trigger position is determined based on a ratio of coordinates of the trigger position of the follow trigger operation in the body image to a first size of the body image on the first screen. Displaying, on the second screen based on the second document position of the target document on the second screen, the content in the target document that corresponds to the second trigger position includes: determining target coordinates corresponding to the ratio in the body image based on a second size of the body image on the second screen, and displaying a pixel area of the target coordinates in the body image on the second screen.

The second size may be specific values of the length and width of the body image on the second screen.

When the content type corresponding to the target document is the body image, the second trigger position may be the ratio of the coordinates of the follow trigger operation in the body image displayed on the first client to the size of the body image.

The second client can calculate, based on the ratio and the second size of the body image on the second screen, the target coordinates of the follow trigger operation in the body image displayed on the second client. Then, a pixel area of the target coordinates in the body image can be displayed on the second screen, where the pixel area may be a pixel point where the target coordinates are located or an area of a preset size centered on the pixel point, etc. The preset size may be set according to actual situations, and is not specifically limited.

For example, assuming that the ratio of the coordinates of the follow trigger operation in the body image displayed on the first client to the size of the body image may be (1/20)×(1/20), and the second size of the body image is 50 px×50 px, then the calculated target coordinates of the follow trigger operation in the body image displayed on the second client are (50/20)×(50/20)=2.5 px×2.5 px.

In this embodiment of the present disclosure, displaying, on the second screen, the content in the target document that corresponds to the second trigger position may include: displaying, in the preset area on the second screen, the content in the target document that corresponds to the second trigger position, where the preset area is an area on the second screen where the sight of the user is focused on. The preset area may be an area on the second screen that can be seen intuitively and quickly by the user, which may be set according to actual situations. For example, the preset area may be an area on the second screen where the sight of the user is focused on, which can be determined through a sight detection program, or the preset area may be a center area in the second screen.

In the document sharing solution provided in this embodiment of the present disclosure, the second client may display the target document, where the target document is synchronously displayed on the first client; receive the second trigger position of the follow trigger operation relative to the target document that is sent by the first client, where the second trigger position is determined by the first client based on the first trigger position of the follow trigger operation relative to the first screen and the first document position of the target document on the first screen; and display, on the second screen based on the second document position of the target document on the second screen and the access address information of the target document, the content in the target document that corresponds to the second trigger position. With the above solution, after a document is synchronously displayed on the two clients, the second client can receive a relative position of the follow trigger operation in the document that is determined by the first client based on a position of the follow trigger operation of the user relative to a screen and a position of the document on the screen, and display, at the center of its screen, content corresponding to the relative position, so that the content seen by a user of the second client must be an area where the follow trigger operation of the user of the first client is located, ensuring that the users of the two clients sharing the document can see the same content synchronously, and avoiding the situation of inconsistency in the content seen by different users in the related art, thereby improving experience of document sharing.

Figure 6:
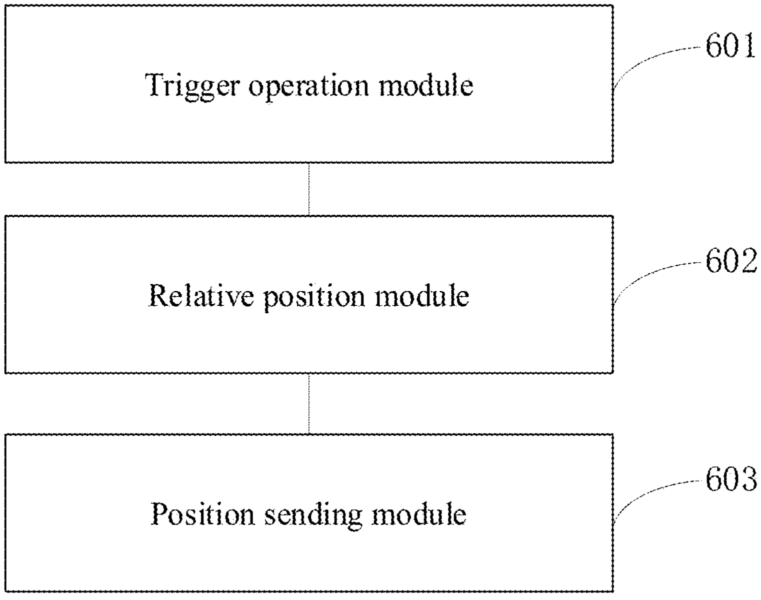
FIG. 6 is a schematic diagram of a structure of a document sharing apparatus according to an embodiment of the present disclosure.

FIG. 6 is a schematic diagram of a structure of a document sharing apparatus according to an embodiment of the present disclosure. The apparatus may be implemented by software and/or hardware, and may generally be integrated into an electronic device. As shown in FIG. 6, the apparatus is configured on a first client and includes the following modules:

- a trigger operation module 601 configured to receive a follow trigger operation for a target document, where the target document is synchronously displayed on the first client and a second client;
- a relative position module 602 configured to determine a second trigger position of the follow trigger operation relative to the target document based on a first trigger position of the follow trigger operation relative to a first screen and a first document position of the target document on the first screen; and
- a position sending module 603 configured to send the second trigger position to the second client, such that the second client displays, on a second screen based on a second document position of the target document on the second screen and access address information of the target document, content in the target document that corresponds to the second trigger position.

Optionally, the target document includes a plurality of document modules, the first document position includes a position of a first displayed document module in the plurality of document modules on the first screen, and the first displayed document module is a document module that is being displayed on the first screen.

Optionally, each of the document modules corresponds to one content type, and the content type includes at least one of table of contents, body text, body image, and comments.

Optionally, the relative position module 602 is specifically configured to: determine, based on the first trigger position and a position of the first displayed document module in the target document on the first screen, a target document module corresponding to a trigger position of the follow trigger operation; and determine the second trigger position of the follow trigger operation relative to the target document module based on the first trigger position and a position of the target document module on the first screen.

Optionally, if a content type corresponding to the target document module is a table of contents or body text, the relative position module 602 is specifically configured to determine a word percentage of a number of words between the trigger position of the follow trigger operation and a start position of the target document module in a total number of words in the target document module, and determine the second trigger position based on the word percentage.

Optionally, when the content type corresponding to the target document module is comments, the relative position module 602 is specifically configured to determine identification information of a comment area in the target document module as the second trigger position if the trigger position of the follow trigger operation is in the comment area.

Optionally, when the content type corresponding to the target document module is a body image, the relative position module 602 is specifically configured to determine coordinates of the trigger position of the follow trigger operation in the body image, and determine the second trigger position based on a ratio of the coordinates of the trigger position of the follow trigger operation in the body image to a first size of the body image on the first screen.

Optionally, the follow trigger operation includes a hover operation or a click operation.

Optionally, the first client and the second client are collaborators for the target document.

Optionally, the first client and the second client initiate collaboration on the target document based on a real-time multimedia conference.

The document sharing apparatus provided in this embodiment of the present disclosure can perform the document sharing method provided in the method embodiment shown in FIG. 1 of the present disclosure, and has corresponding functional modules and beneficial effects for performing the method.

Figure 7:
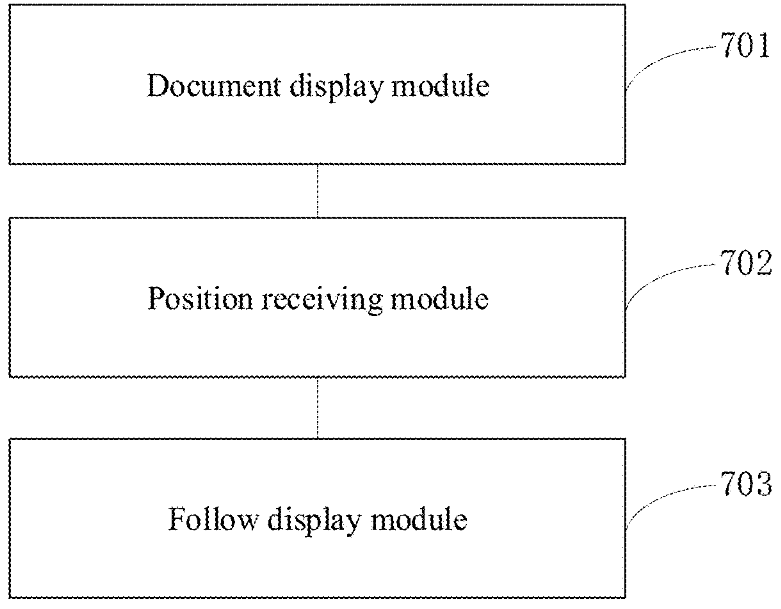
FIG. 7 is a schematic diagram of a structure of another document sharing apparatus according to an embodiment of the present disclosure.

FIG. 7 is a schematic diagram of a structure of another document sharing apparatus according to an embodiment of the present disclosure. The apparatus may be implemented by software and/or hardware, and may generally be integrated into an electronic device. As shown in FIG. 7, the apparatus is configured on a second client and includes the following modules:

- a document display module 701 configured to display a target document, where the target document is synchronously displayed on a first client;
- a position receiving module 702 configured to receive a second trigger position of a follow trigger operation relative to the target document that is sent by the first client, where the second trigger position is determined by the first client based on a first trigger position of the follow trigger operation relative to a first screen and a first document position of the target document on the first screen; and
- a follow display module 703 configured to display, on a second screen based on a second document position of the target document on the second screen and access address information of the target document, content in the target document that corresponds to the second trigger position.

Optionally, the target document includes a plurality of document modules, the second document position includes a position of a second displayed document module in the plurality of modules on the second screen, and the second displayed document module is a document module that has been displayed on the second screen.

Optionally, the second trigger position is a position of the follow trigger operation relative to a target document module, and the target document module is a document module in the target document that corresponds to the follow trigger operation.

Optionally, if a content type corresponding to the target document module is a table of contents or body text, the second trigger position is determined based on a word percentage of a number of words between the trigger position of the follow trigger operation and a start position of the target document module in a total number of words in the target document module.

The follow display module 703 is specifically configured to determine target words corresponding to the word percentage in the table of contents or the body text based on a position of the table of contents or the body text on the second screen, and display, on the second screen, the target words or a text line where the target words are located.

Optionally, when the content type corresponding to the target document module is comments, the second trigger position is identification information of a comment area in the target document module where the trigger position of the follow trigger operation is located.

The follow display module 703 is specifically configured to locate the comment area in the comments according to the identification information and based on a position of the comments on the second screen, and display the comment area on the second screen.

Optionally, the apparatus further includes a prominent display module configured to prominently display the comment area in a preset manner after the comment area is displayed on the second screen, where the preset manner includes at least one of highlighting, bolding, and underlining.

Optionally, when the content type corresponding to the target document is a body image, the second trigger position is determined based on a ratio of coordinates of the trigger position of the follow trigger operation in the body image to a first size of the body image on the first screen.

The follow display module 703 is specifically configured to determine target coordinates corresponding to the ratio in the body image based on a second size of the body image in the second screen, and display a pixel area of the target coordinates in the body image on the second screen.

Optionally, the follow display module 703 is specifically configured to: display, in a preset area on the second screen, the content in the target document that corresponds to the second trigger position, where the preset area is an area on the second screen where the sight of the user is focused on.

The document sharing apparatus provided in this embodiment of the present disclosure can perform the document sharing method provided in the method embodiment shown in FIG. 4 of the present disclosure, and has corresponding functional modules and beneficial effects for performing the method.

An embodiment of the present disclosure further provides a computer program product, including a computer program/instructions that, when executed by a processor, implements/implement the document sharing method provided in any of the embodiments of the present disclosure.

Figure 8:
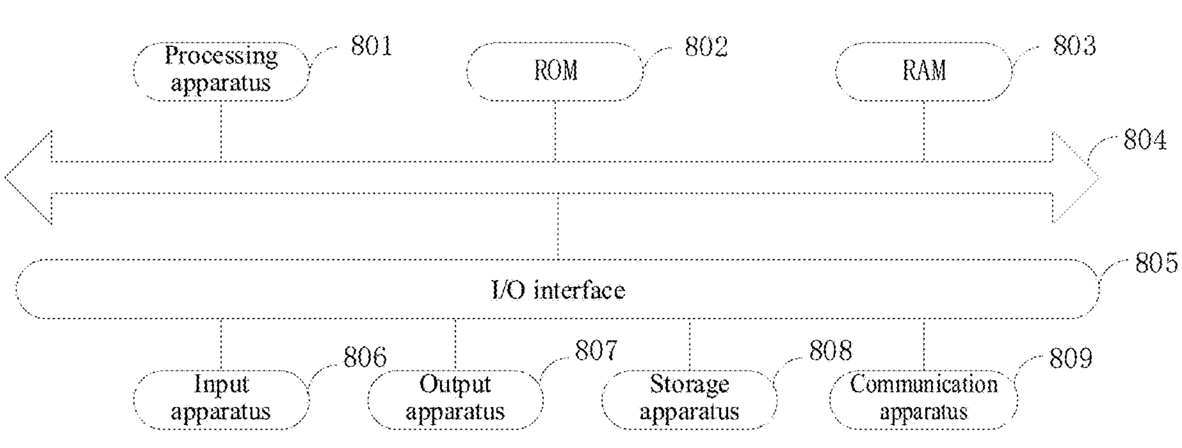
FIG. 8 is a schematic diagram of a structure of an electronic device according to an embodiment of the present disclosure.

FIG. 8 is a schematic diagram of a structure of an electronic device according to an embodiment of the present disclosure.

Reference is made specifically to FIG. 8 below, which is a schematic diagram of a structure of an electronic device 800 suitable for implementing the embodiments of the present disclosure. The electronic device 800 in this embodiment of the present disclosure may include, but is not limited to, mobile terminals such as a mobile phone, a notebook computer, a digital broadcast receiver, a personal digital assistant (PDA), a tablet computer (PAD), a portable multimedia player (PMP), and a vehicle-mounted terminal (such as a vehicle navigation terminal), and fixed terminals such as a digital TV and a desktop computer. The electronic device shown in FIG. 8 is merely an example, and shall not impose any limitation on the function and scope of use of the embodiments of the present disclosure.

As shown in FIG. 8, the electronic device 800 may include a processing apparatus (e.g., a central processor, a graphics processor, etc.) 801 that may perform a variety of appropriate actions and processing in accordance with a program stored in a read-only memory (ROM) 802 or a program loaded from a storage apparatus 808 into a random-access memory (RAM) 803. The RAM 803 further stores various programs and data required for the operation of the electronic device 800. The processing apparatus 801, the ROM 802, and the RAM 803 are connected to each other through a bus 804. An input/output (I/O) interface 805 is also connected to the bus 804.

Generally, the following apparatuses may be connected to the I/O interface 805: an input apparatus 806 including, for example, a touch screen, a touchpad, a keyboard, a mouse, a camera, a microphone, an accelerometer, a gyroscope, etc. ; an output apparatus 807, for example, including a liquid crystal display (LCD), a speaker, a vibrator, etc. ; a storage apparatus 808, for example, including a tape, a hard disk, etc. ; and a communication apparatus 809. The communication apparatus 809 may allow the electronic device 800 to perform wireless or wired communication with other devices to exchange data. Although FIG. 8 shows the electronic device 800 having various apparatuses, it should be understood that it is not required to implement or have all of the shown apparatuses. It may be an alternative to implement or have more or fewer apparatuses.

In particular, according to an embodiment of the present disclosure, the process described above with reference to the flowcharts may be implemented as a computer software program. For example, this embodiment of the present disclosure includes a computer program product, which includes a computer program carried on a non-transitory computer-readable medium, where the computer program includes program code for performing the method shown in the flowchart. In such an embodiment, the computer program may be downloaded and installed from a network through the communication apparatus 809, or installed from the storage apparatus 808, or installed from the ROM 802. When the computer program is executed by the processing apparatus 801, the above-mentioned functions defined in the document sharing method of the embodiment of the present disclosure are performed.

It should be noted that the above computer-readable medium described in the present disclosure may be a computer-readable signal medium, or a computer-readable storage medium, or any combination thereof. The computer-readable storage medium may be, for example but not limited to, electric, magnetic, optical, electromagnetic, infrared, or semiconductor systems, apparatuses, or devices, or any combination thereof. A more specific example of the computer-readable storage medium may include, but is not limited to: an electrical connection having one or more wires, a portable computer magnetic disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof. In the present disclosure, the computer-readable storage medium may be any tangible medium containing or storing a program which may be used by or in combination with an instruction execution system, apparatus, or device. In the present disclosure, the computer-readable signal medium may include a data signal propagated in a baseband or as a part of a carrier, the data signal carrying computer-readable program code. The propagated data signal may be in various forms, including but not limited to an electromagnetic signal, an optical signal, or any suitable combination thereof. The computer-readable signal medium may also be any computer-readable medium other than the computer-readable storage medium. The computer-readable signal medium can send, propagate, or transmit a program used by or in combination with an instruction execution system, apparatus, or device. Program code contained on a computer-readable medium may be transmitted through any appropriate medium, including but not limited to electric wires, optical cables, radio frequency (RF), etc., or any suitable combination thereof.

In some implementations, the client and the server can communicate using any currently known or future-developed network protocol such as a HyperText Transfer Protocol (HTTP), and can be connected to digital data communication (for example, communication network) in any form or medium. Examples of the communication network include a local area network ("LAN"), a wide area network ("WAN"), an internetwork (for example, the Internet), a peer-to-peer network (for example, an ad hoc peer-to-peer network), and any currently known or future-developed network.

The above computer-readable medium may be contained in the above electronic device. Alternatively, the computer-readable medium may exist independently, without being assembled into the electronic device.

The above computer-readable medium carries one or more programs that, when executed by the electronic device, cause the electronic device to perform the following operations: receiving a follow trigger operation for a target document, where the target document is synchronously displayed on the first client and a second client; determining a second trigger position of the follow trigger operation relative to the target document based on a first trigger position of the follow trigger operation relative to a first screen and a first document position of the target document on the first screen; and sending the second trigger position to the second client, such that the second client displays, on a second screen based on a second document position of the target document on the second screen and access address information of the target document, content in the target document that corresponds to the second trigger position.

Alternatively, the above computer-readable medium carries one or more programs that, when executed by the electronic device, cause the electronic device to perform the following operations: displaying a target document, where the target document is synchronously displayed on a first client; receiving a second trigger position of a follow trigger operation relative to the target document that is sent by the first client, where the second trigger position is determined by the first client based on a first trigger position of the follow trigger operation relative to a first screen and a first document position of the target document on the first screen; and displaying, on a second screen based on a second document position of the target document on the second screen and access address information of the target document, content in the target document that corresponds to the second trigger position.

Computer program code for performing operations of the present disclosure can be written in one or more programming languages or a combination thereof, where the programming languages include but are not limited to object-oriented programming languages, such as Java, Smalltalk, and C++, and further include conventional procedural programming languages, such as "C" language or similar programming languages. The program code may be completely executed on a computer of a user, partially executed on a computer of a user, executed as an independent software package, partially executed on a computer of a user and partially executed on a remote computer, or completely executed on a remote computer or server. In the circumstance involving a remote computer, the remote computer may be connected to a computer of a user over any type of network, including a local area network (LAN) or a wide area network (WAN), or may be connected to an external computer (for example, connected over the Internet using an Internet service provider).

The flowcharts and block diagrams in the accompanying drawings illustrate the possibly implemented architecture, functions, and operations of the system, method, and computer program product according to various embodiments of the present disclosure. In this regard, each block in the flowchart or block diagram may represent a module, program segment, or part of code, and the module, program segment, or part of code contains one or more executable instructions for implementing the specified logical functions. It should also be noted that, in some alternative implementations, the functions marked in the blocks may also occur in an order different from that marked in the accompanying drawings. For example, two blocks shown in succession can actually be performed substantially in parallel, or they can sometimes be performed in the reverse order, depending on the functions involved. It should also be noted that each block in the block diagram and/or the flowchart, and a combination of the blocks in the block diagram and/or the flowchart may be implemented by a dedicated hardware-based system that executes specified functions or operations, or may be implemented by a combination of dedicated hardware and computer instructions.

The related units described in the embodiments of the present disclosure may be implemented by means of software, or may be implemented by means of hardware. The name of a unit does not constitute a limitation on the unit itself in some cases.

The functions described herein above may be performed at least partially by one or more hardware logic components. For example, without limitation, exemplary types of hardware logic components that may be used include: a field programmable gate array (FPGA), an application-specific integrated circuit (ASIC), an application-specific standard product (ASSP), a system-on-chip (SOC) system, a complex programmable logic device (CPLD), and the like.

In the context of the present disclosure, a machine-readable medium may be a tangible medium that may contain or store a program for use by or in conjunction with an instruction execution system, apparatus, or device. A machine-readable medium may be a machine-readable signal medium or a machine-readable storage medium. A machine-readable medium may include, but is not limited to, electronic, magnetic, optical, electromagnetic, infrared, or semiconductor systems, apparatus, or devices, or any suitable combination thereof. More specific examples of a machine-readable storage medium may include an electrical connection based on one or more wires, a portable computer disk, a hard disk, a random access memory (RAM), a read-only memory (ROM), an erasable programmable read-only memory (EPROM or flash memory), an optic fiber, a portable compact disk read-only memory (CD-ROM), an optical storage device, a magnetic storage device, or any suitable combination thereof.

The foregoing descriptions are merely preferred embodiments of the present disclosure and explanations of the applied technical principles. Those skilled in the art should understand that the scope of disclosure involved in the present disclosure is not limited to the technical solutions formed by specific combinations of the foregoing technical features, and shall also cover other technical solutions formed by any combination of the foregoing technical features or equivalent features thereof without departing from the foregoing concept of disclosure. For example, a technical solution formed by a replacement of the foregoing features with technical features with similar functions disclosed in the present disclosure (but not limited thereto) also falls within the scope of the present disclosure.

In addition, although the various operations are depicted in a specific order, it should be understood as requiring these operations to be performed in the specific order shown or in a sequential order. Under certain circumstances, multitasking and parallel processing may be advantageous. Similarly, although several specific implementation details are included in the foregoing discussions, these details should not be construed as limiting the scope of the present disclosure. Some features that are described in the context of separate embodiments can also be implemented in combination in a single embodiment. In contrast, various features described in the context of a single embodiment may alternatively be implemented in a plurality of embodiments individually or in any suitable subcombination.

Although the subject matter has been described in a language specific to structural features and/or logical actions of the method, it should be understood that the subject matter defined in the appended claims is not necessarily limited to the specific features or actions described above. In contrast, the specific features and actions described above are merely exemplary forms of implementing the claims.

The invention claimed is:

1. A document sharing method applied to a first client, the method comprising:

receiving a follow trigger operation for a target document, wherein the target document is synchronously displayed on the first client and a second client;

determining a second trigger position of the follow trigger operation relative to the target document based on a first trigger position of the follow trigger operation relative to a first screen of the first client and a first document position of the target document on the first screen of the first client;

wherein the target document comprises a plurality of document modules, the first document position comprises a position of a first displayed document module in the plurality of document modules on the first screen of the first client, and the first displayed document module is a document module that is being displayed on the first screen of the first client;

sending the second trigger position to the second client, such that the second client displays, on a second screen based on a second document position of the target document on the second screen and access address information of the target document on the second screen of the second client, content in the target document on the second screen of the second client that corresponds to the second trigger position;

wherein determining the second trigger position of the follow trigger operation relative to the target document based on the first trigger position of the follow trigger operation relative to the first screen of the first client and the first document position of the target document on the first screen of the first client comprises:

determining, based on the first trigger position and a position of the first displayed document module in the target document on the first screen, a target document module corresponding to the first trigger position of the follow trigger operation, and determining the second trigger position of the follow trigger operation relative to the target document module based on the first trigger position and a position of the target document module on the first screen;

wherein a content type corresponding to the target document module is a body image, and the determining the second trigger position of the follow trigger operation relative to the target document module comprises:

determining coordinates of the first trigger position of the follow trigger operation in the body image, and determining the second trigger position based on a ratio of the coordinates of the first trigger position of the follow trigger operation in the body image to a first size of the body image on the first screen.

2. The method according to claim 1, wherein each of the document modules corresponds to one content type, and the content type comprises at least one of table of contents, body text, body image, and comments.

3. The method according to claim 1, wherein if a content type corresponding to the target document module is a table of contents or body text, the determining the second trigger position of the follow trigger operation relative to the target document module comprises:

determining a word percentage of a number of words between the trigger position of the follow trigger operation and a start position of the target document module in a total number of words in the target document module, and determining the second trigger position based on the word percentage.

4. The method according to claim 1, wherein a content type corresponding to the target document module is comments, and the determining the second trigger position of the follow trigger operation relative to the target document module comprises:

determining identification information of a comment area in the target document module as the second trigger position if the trigger position of the follow trigger operation is in the comment area.

5. The method according to claim 1, wherein the follow trigger operation comprises a hover operation or a click operation.

6. The method according to claim 1, wherein at least one of: the first client and the second client are collaborators for the target document, and the first client and the second client initiate collaboration on the target document based on a real-time multimedia conference.

7. A document sharing method applied to a second client, the method comprising:

displaying a target document, wherein the target document is synchronously displayed on a first client;

receiving a second trigger position of a follow trigger operation relative to the target document that is sent by the first client, wherein the second trigger position is determined by the first client based on a first trigger position of the follow trigger operation relative to a first screen of the first client and a first document position of the target document on the first screen;

displaying, on a second screen of the second client based on a second document position of the target document on the second screen and access address information of the target document, content in the target document that corresponds to the second trigger position;

wherein the target document comprises a plurality of document modules, the second document position comprises a position of a second displayed document module in the plurality of modules on the second screen of the second client, and the second displayed document module is a document module that has been displayed on the second screen of the second client;

wherein the second trigger position is a position of the follow trigger operation relative to a target document module, and the target document module is a document module in the target document that corresponds to the follow trigger operation; and wherein a content type corresponding to the target document module is a body image, the second trigger position is determined based on a ratio of coordinates of the trigger position of the follow trigger operation in the body image to a first size of the body image on the first screen of the first client.

8. The method according to claim 7, wherein if a content type corresponding to the target document module is a table of contents or body text, the second trigger position is determined based on a word percentage of a number of words between the trigger position of the follow trigger operation and a start position of the target document module in a total number of words in the target document module; and displaying, on the second screen based on the second document position of the target document on the second screen, the content in the target document that corresponds to the second trigger position comprises:

determining target words corresponding to the word percentage in the table of contents or the body text based on a position of the table of contents or the body text on the second screen, and displaying, on the second screen, the target words or a text line where the target words are located.

9. The method according to claim 7, wherein when a content type corresponding to the target document module is comments, the second trigger position is identification information of a comment area in the target document module where the trigger position of the follow trigger operation is located; and displaying, on the second screen based on the second document position of the target document on the second screen, the content in the target document that corresponds to the second trigger position comprises:

locating the comment area in the comments according to the identification information and based on a position of the comments on the second screen, and displaying the comment area on the second screen;

wherein after displaying the comment area on the second screen, the method further comprises:

prominently displaying the comment area in a preset manner, wherein the preset manner comprises at least one of highlighting, bolding, and underlining.

10. The method according to claim 7, further comprising:

displaying, on the second screen based on the second document position of the target document on the second screen, the content in the target document that corresponds to the second trigger position comprises:

determining target coordinates corresponding to the ratio in the body image based on a second size of the body image in the second screen, and displaying a pixel area of the target coordinates in the body image on the second screen.

11. The method according to claim 7, wherein displaying, on the second screen, the content in the target document that corresponds to the second trigger position comprises:

displaying, in a preset area on the second screen, the content in the target document that corresponds to the second trigger position, wherein the preset area is an area on the second screen where the sight of the user is focused on.

12. An electronic device, comprising:

a processor; and a memory configured to store instructions executable by the processor, wherein the processor is configured to read the executable instructions from the memory, and execute the instructions to implement the document sharing method applied to a first client, comprising:

receiving a follow trigger operation for a target document, wherein the target document is synchronously displayed on the first client and a second client;

determining a second trigger position of the follow trigger operation relative to the target document based on a first trigger position of the follow trigger operation relative to a first screen of the first client and a first document position of the target document on the first screen of the first client;

sending the second trigger position to the second client, such that the second client displays, on a second screen of the second client based on a second document position of the target document on the second screen of the second client and access address information of the target document, content in the target document that corresponds to the second trigger position;

wherein the target document comprises a plurality of document modules, the first document position comprises a position of a first displayed document module in the plurality of document modules on the first screen of the first client, and the first displayed document module is a document module that is being displayed on the first screen of the first client;

wherein determining the second trigger position of the follow trigger operation relative to the target document based on the first trigger position of the follow trigger operation relative to the first screen of the first client and the first document position of the target document on the first screen of the first client comprises:

determining, based on the first trigger position and a position of the first displayed document module in the target document on the first screen of the first client, a target document module corresponding to a trigger position of the follow trigger operation, and determining the second trigger position of the follow trigger operation relative to the target document module based on the first trigger position and a position of the target document module on the first screen of the first client; and wherein a content type corresponding to the target document module is a body image, and the determining the second trigger position of the follow trigger operation relative to the target document module comprises:

determining coordinates of the first trigger position of the follow trigger operation in the body image, and determining the second trigger position based on a ratio of the coordinates of the first trigger position of the follow trigger operation in the body image to a first size of the body image on the first screen.

13. A non-transitory computer-readable storage medium having stored thereon a computer program for performing the document sharing method according to claim 1.

14. An electronic device, comprising:

a processor, and a memory configured to store instructions executable by the processor, wherein the processor is configured to read the executable instructions from the memory, and execute the instructions to implement the document sharing method according to claim 7.

15. A non-transitory computer-readable storage medium having stored thereon a computer program for performing the document sharing method according to claim 7.

* * * * *